United States Patent [19]

Fuchsberger

[11] Patent Number: 4,831,434

[45] Date of Patent: May 16, 1989

[54] METHOD OF CORRECTING COLOR SATURATION IN ELECTRONIC IMAGE PROCESSING

[75] Inventor: Hermann Fuchsberger, Ismaning, Fed. Rep. of Germany

[73] Assignee: AGFA Gevaert Aktiengesellschaft, Leverkusen, Fed. Rep. of Germany

[21] Appl. No.: 85,977

[22] Filed: Aug. 14, 1987

[30] Foreign Application Priority Data

Aug. 29, 1986 [DE] Fed. Rep. of Germany ....... 3629403

[51] Int. Cl.$^4$ .................. G03F 3/08; H04N 1/46; H04N 9/64
[52] U.S. Cl. ........................... 358/80; 358/40; 358/75
[58] Field of Search .......... 358/75, 80, 27, 28, 358/29, 29 C, 36, 37, 39, 40, 76, 78

[56] References Cited

U.S. PATENT DOCUMENTS

| | | | |
|---|---|---|---|
| 3,835,243 | 9/1974 | Nagaoka | 358/36 |
| 4,058,828 | 11/1977 | Ladd | 358/80 |
| 4,499,486 | 2/1985 | Favreau et al. | 358/37 |
| 4,661,843 | 4/1987 | Sekizawa et al. | 358/80 |
| 4,706,111 | 11/1987 | Abe et al. | 358/36 |
| 4,712,132 | 12/1987 | Soca | 358/37 |
| 4,734,763 | 3/1988 | Urabe et al. | 358/80 |

FOREIGN PATENT DOCUMENTS

| | | |
|---|---|---|
| 0070680 | 1/1983 | European Pat. Off. . |
| 0131430 | 1/1985 | European Pat. Off. . |
| 0168818 | 1/1986 | European Pat. Off. . |
| 60-83488 | 5/1985 | Japan ................ 358/29 C |
| 60-254985 | 12/1985 | Japan ................ 358/27 |
| 60-256292 | 12/1985 | Japan ................ 358/27 |
| 86/03087 | 5/1986 | PCT Int'l Appl. ........ 358/27 |

Primary Examiner—James J. Groody
Assistant Examiner—Randall S. Svihla
Attorney, Agent, or Firm—Peter K. Kontler

[57] ABSTRACT

An improved method for correction of color saturation, in electronic image processing, automatically compensates for brightness changes resulting from contrast processing. The method is used with electronic image processing, in which a two-dimensional original image is electro-optically scanned along rows and columns for three primary colors, the resulting image signals are transformed into a luminance signal Y and two color-difference or chrominance signals C1, C2, and the luminance signal is modified by electronic contrast processing. The invention improves the basic image processing method by measuring the luminance signals $Y_1$ and $Y_2$ which occur, respectively, before and after contrast processing, and multiplying their quotient $Y_2/Y_1$ by each of the two chrominance signals C1, C2. This compensates automatically for the increase in color saturation which accompanies a brightness reduction and for the decrease in color saturation which accompanies a brightness increase.

4 Claims, 4 Drawing Sheets

METHOD OF CORRECTING COLOR SATURATION IN ELECTRONIC IMAGE PROCESSING

Cross-reference to related applications, assigned to the assignee of the present invention:
METHOD OF ELECTRONICALLY IMPROVING THE SHARPNESS AND CONTRAST OF A COLORED IMAGE FOR COPYING, Ser. No. 085,942 filed Aug. 14, 1987, by Wagensonner et al.
METHOD AND APPARATUS FOR THE REPRODUCTION OF ORIGINALS, Ser. No. 085,941 filed Aug. 14, 1987, by Wagensonner et al.
METHOD AND APPARATUS FOR ELECTRONIC CONTRAST VALUATION OF TRANSPARENCIES, Ser. No. 085,865 filed Aug. 14, 1987, by Fuchsberger et al.
METHOD AND APPARATUS FOR ADJUSTING COLOR SATURATION IN ELECTRONIC IMAGE PROCESSING, Ser. No. 085,864 filed Aug. 14, 1987, by Fuchsberger.

BACKGROUND OF THE INVENTION

The invention relates generally to a method and apparatus for correcting color saturation in an electronic image processing system, in which a two-dimensional original image is electro-optically scanned in three primary colors by rows and columns, and, more particularly, to a method and apparatus in which the image signals are transformed to a luminance signal Y and two color difference signals or chrominance signals C1, C2 and the luminance signal Y is modified by electronic contrast processing of the image.

The aforementioned transformation is known in principle in the video art. There it is directed primarily to using electronic means to undertake color corrections if reception-induced color errors are present (e.g. color distortion) or if, during transmission, false color casts arise, which must be compensated. In electronic image processing, one often wishes to enhance the color saturation and color contrast of an image or to optimally match these to the characteristics of a photographic recording medium. The fundamentals of electronic color correction are described in, for example, the books *Farbmetrik und Farbfernsehen* (Color Measurement and Color Television), by H. Lang, pages 326 to 334 and 431ff, R. Oldenbourg-Verlag publishing house, Munich/Vienna 1978, and *Digital Image Processing*, by W. K. Pratt, particularly pages 50–90 and 155–161, John Wiley & Sons, New York/Chicester/Brisbane/Toronto, 1978.

Contrast valuation or weighting in the luminance channel is carried out in electronic image processing, in order to match the gradation of the overall transmission system to the photographic recording medium (global contrast valuation) and to enhance the contrast in specific image portion (local contrast valuation). A sharpening of the image can be achieved in this manner. The fundamentals of these methods are described in detail in the books *Digital Bildverarbeitung*, by F. M. Wahl, Springer-Verlag publishing house, Berlin/Heidelberg/New York/Tokyo, 1984, and *Digital Image Processing*, by W. K. Pratt, (loc. cit., see above).

In the reproduction of colored original images (positive-positive) or the manufacture of color photographic positive pictures from color negative originals, greater and greater reliance is being placed on electronic image processing and the use of color correction circuits. See, for example, European Patent Applications Nos. 70 680, 131 430, and 168 818. European Patent Application No. 168 818 corresponds to U.S. Pat. No. 4,661,843. Fundamentally, the original image is sampled (scanned) along lines and columns, and the resulting image signals are modified according to specific criteria. The image signals defining one image or frame are, as a rule, digitized and may be placed in a digital memory or in intermediate storage. The sampling of the original image is normally carried out serially for the three primary colors red, green blue (RGB).

Experience has shown that, for production of optimal positive images, the following image parameters must be adjusted or be capable of being adjusted:
 (a) color balance,
 (b) color saturation,
 (c) contrast (gradation).

There is often the difficulty that these parameters cannot be adjusted independently of one another. When one adjusts the gradation, one finds that, for example, the color saturation has changed. For this reason, in video technology the RGB image signals are transformed into one brightness signal and two chrominance signals containing only color information. In electronic image processing, it has been found that contrast processing in the luminance channel can cause an influence on the color saturation in the chrominance channels. This color saturation shifting cannot be tolerated when image quality requirements are high. In particular, it has been observed that, upon enhancement of the brightness (high amplification of the luminance signal), a desaturation of the image occurs, while, upon reduction of the brightness, the image appears more strongly saturated.

OBJECTS AND SUMMARY OF THE INVENTION

This is where the present invention comes in. It is an object of the present invention to provide new electronic means for electronic image processing, which make possible a complete decoupling of the color saturation from the contrast characteristics of the image. For adjustment and matching of the gradation, relatively strong contrast changes in the luminance channel are often necessary. The visually striking and image-degrading saturation shifts accompanying these contrast changes are avoided by using the present invention.

Briefly, the present invention achieves this by improving the method described above, by measuring the luminance signals $Y_1$ and $Y_2$ which occur, respectively, before and after contrast processing, and multiplying their quotient $Y_2/Y_1$ by each of the two chrominance signals C1, C2. This compensates automatically for the increase in color saturation which accompanies a brightness reduction and for the decrease in color saturation which accompanies a brightness increase.

For transformation of the image signals into one luminance signal specifying the brightness or light density and two chrominance signals containing the color information, preferably the RGB-to-YUV transformation, known from the television art, is used.

A further improvement in image quality can be achieved, if the quotient $Y_2/Y_1$ is also multiplied by a correction factor k, which is selected to be relatively large for small values of the ratio $Y_2/Y_1$ and to decrease toward large values of $Y_2/Y_1$. In this manner, one achieves a stronger color saturation correction with small changes in the luminance signal (small contrast enhancement) than with large changes in the luminance signal. This accords with the physiologically determined perceptual capacity of the human eye with respect to color saturation differences.

A significant feature of the method of the invention is that the adjustment of the color saturation, in dependence on the luminance signal as modified by contrast processing, is accomplished automatically, i.e. without external input or adjustments. Because of this automatic adjustment of the color saturation, the expressed color impression of image remains undamaged by the contrast processing measures.

The novel features which are considered as characteristic of the invention are set forth in particular in the appended claims. The improved color saturation correction method, as well as the construction and mode of operation of the improved color saturation correction apparatus, together with additional features and advantages thereof, will, however, be best understood upon perusal of the following detailed description of certain specific embodiments, with reference to the accompanying drawing.

BRIEF FIGURE DESCRIPTION

The method of the present invention will be described below with reference to the block diagrams and sketches of the drawings, in which.

DESCRIPTION OF THE PREFERRED EMBODIMENTS

Figure 1:
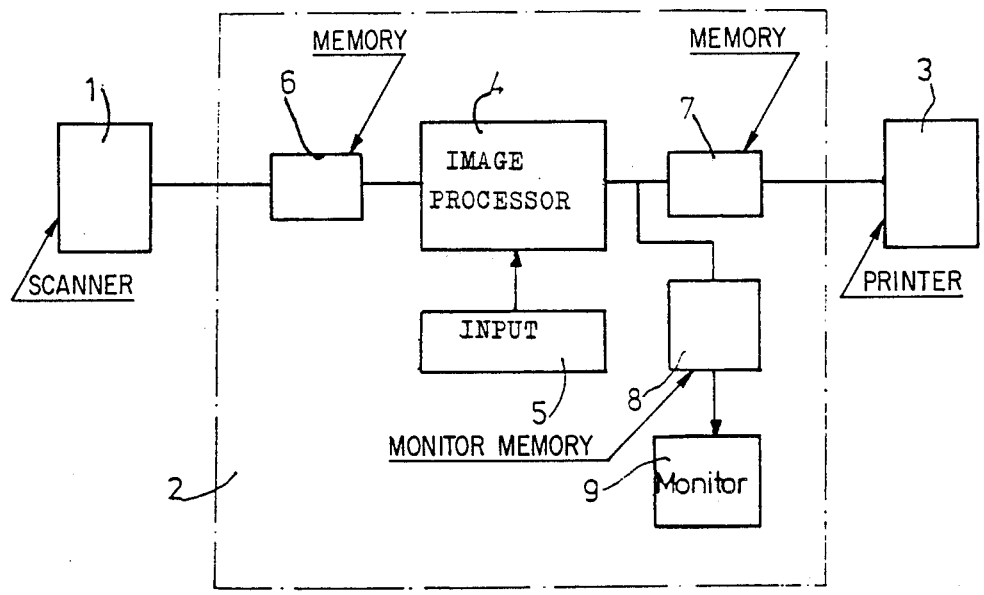
FIG. 1 shows the three main modules of an image processor, namely the image sampling apparatus or scanner, the actual image processing portion, and the image output apparatus (printer)

As shown in FIG. 1, the original image is sampled along vertical lines with a scanner 1, so that an electronic image signal is generated for every image point or pixel. Scanner 1 comprises a CCD (Charge Coupled Device) line sensor oriented along a horizontal line, which travels with constant speed in the vertical direction over the image surface, scanning. The sampling is done sequentially for the three primary colors red, green, blue (RGB). For this purpose, special color filters are pivoted into the light path between the CCD line sensor and the original image.

The electro-optically sampled image comprises 2048 image points per line (horizontal) and 1024 lines (vertical), so that each image has in the aggregate 2048 × 1024 image elements (pixels), to each of which are assigned three primary color values RGB. A correction circuit (not shown) assures that CCD-specific defects, e.g. differing sensitivities of the CCD elements and dark current photocells, are eliminated. The corrected image signals are thereafter digitized. Only then does the actual electronic image processing occur, as summarized in FIG. 1 in the dot-dashed-line block 2.

The last element in the image processing chain is the image output device 3, here a cathode ray printer, which transforms the electrical image signals back into an optical image, which then exposes the photographic recording material, e.g. color negative paper. The significant feature is that, in the printer, the optical image is built up point-for-point by transformation of the electrical image signals. Therefore, in principle, one can subject each pixel to image processing and then output it at coordinates on the recording medium corresponding to its coordinates on the original image.

The actual electronic image processing occurs in an image processor 4 which can be externally controlled over an input 5. Upstream and downstream of the image processor 4, the image is stored in respective memories 6 and 7 (SP1 and SP2). These intermediate memories enable printer 3 to retrieve and plot an image from memory 7 while a new image is simultaneously being read into memory 6 and processed by image processor 4. The three basic steps of sampling (scanner 1), image processing in image processor 4, and image recording (printer 3) are thus decoupled. The image which has been processed in image processor 4 and is intended for recording can be placed in intermediate storage in a monitor memory 8 and displayed on a monitor 9. These blocks or steps are classified as part of image processing 2.

The present invention is directed primarily to special electronic measure for image matching and image enhancement, for which, in the final analysis, the evaluation criteria are the visual impression. Specifically, the image processor has the following tasks and functions:

(a) adjustment of the color balance,
(b) adjustment of the color saturation in multiple steps,
(c) image-dependent adjustment of the gradation,
(d) image sharpness improvement.

The image processing functions are explained in detail with reference to FIG. 2. An important feature is the image-dependent, automatic correction of color saturation, whenever global or local contrast processing is being simultaneously carried out for enhancement of image sharpness.

Figure 2:
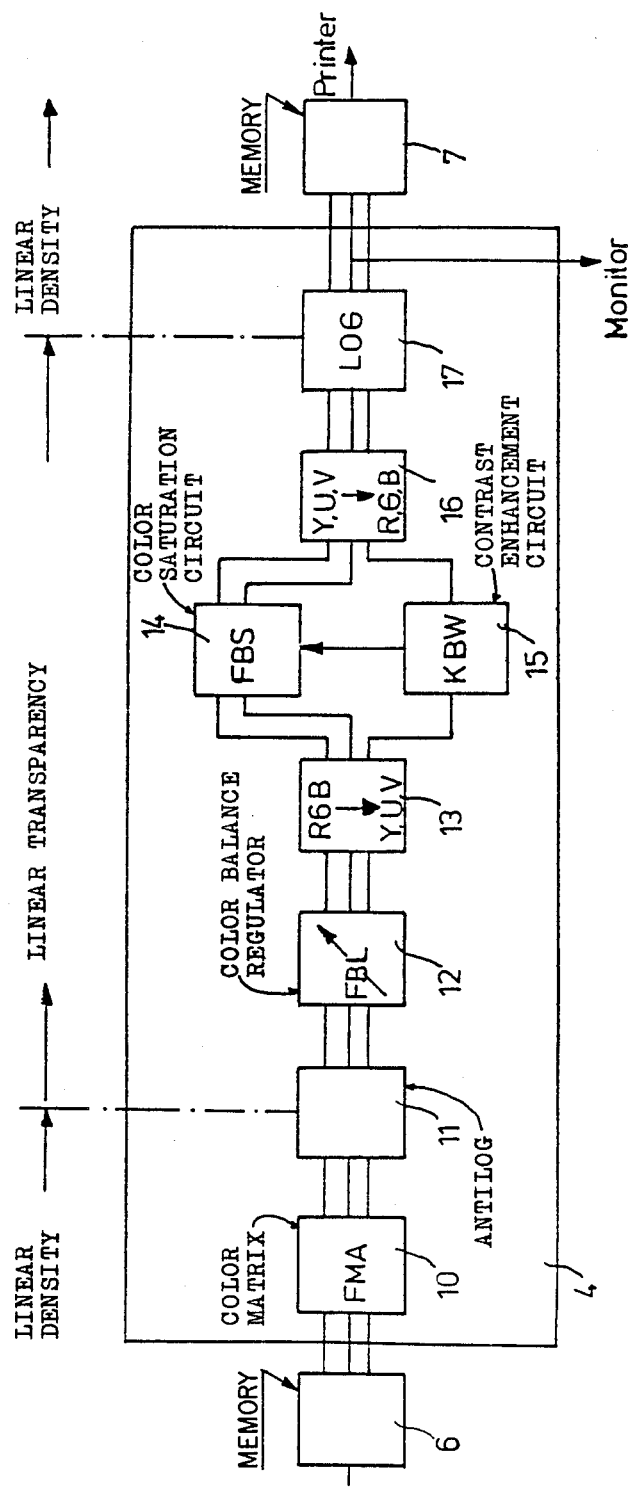
FIG. 2 is a schematic block diagram of the image processor in the image processing portion.

As shown in FIG. 2, the image processor encompasses elements 10 through 17. The image signals stored in image memory 6 (SP1) are fed to a color matrix 10, which serves to correct sidewise bleeding or slop-over of the dyes of the original images (cross-talk). The color matrix includes a programmed permanent (e.g. PROM=Programmable Read-Only Memory) memory in which each original image signal A (x,y) is associated with a corrected image signal A' (x,y). A memory programmed in this sense as a table is therefore referred to as a Look-Up Table (LUT for short).The aforementioned color corrections cannot be carried out before this point, because the image signals of all three color data RGB first become available in parallel after memroy 6. Subsequently, antilogarithms of the linear density stored imaged signals are taken with the help of a Look-Up-Table 11, so that, from this point on, linear transparency image signals are again available.

With the color balance regulator 12, color deviations (e.g. color cast) which are not imposed by the system can be compensated or a deliberate deviation from the standardized gray scale (achromatic scale) can be achieved. In the following element 13, the RGB image signals are transformed into one color-independent brightness signal Y (luminance signal) and two brightness-independent color difference signals U, V (chrominance signals). The transformation is accomplished in the known manner according to the following equations:

$$Y = 0.3\,R + 0.6\,G + 0.1\,B$$

$$U = B - Y$$

$$V = R - Y.$$

This transformation presupposes linear transparency signals. By means of circuit 14, to which are fed only the chrominance signals U, V, the color saturation is automatically corrected in dependence upon the post-contrast-processing luminance signal Y'. Independent selection of the color saturation is possible in multiple steps by means of keys at input 5. The luminance signal Y is fed through the lower channel shown in FIG. 2 into the contrast enhancement circuit 15 for modification or matching of gradation (global contrast processing) and, separately, enhancement of higher local frequencies (local contrast valuation). The modified chrominance and luminance signals are transformed back in element 16 into corresponding RGB-signals according to the inverse function of the aforementioned equations. The logarithms of these RGB signals are then taken in a logarithmic circuit 17, so that in the following signal processing, linear-density image signals are again provided.

The transformation RGB-to-YUV was adopted from video technology and has proven itself useful in electronic image processing in the present case. There are also other transformations which offer a pure brightness signal Y and to chrominance signals C1, C2 containing the color information. Among these, in particular, are the IHS-transformation and the lab-transformation. The details of these are set forth in the technical literature (see, e.g. pages 84–87 of *Digital Image Processing*, by W. K. Pratt, published by John Wiley & Sons). For the sake of simplicity, the following examples assume always that the RGB-to-YUV transformation is used.

The preferred embodiments of the circuitry for correction of color saturation in dependence upon the brightness, as modified by the contrast enhancement circuit 15, will now be described. The corresponding circuits are components of element 14, which is connected to the contrast valuation circuit 15, and whose function will be explained in detail below.

In the luminance-chrominance system, the color space is defined by the luminance axis Y and the two chrominance axes U and V. Correspondingly, a color vector F has a brightness or light density specifying component Y and two chrominance components U, V which contain only color information.

Figure 3:
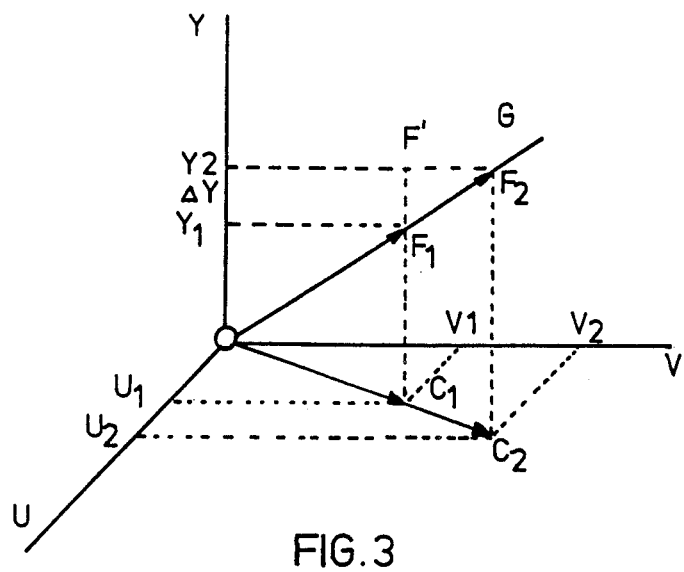
FIG. 3 represents a color vector in the luminance-chrominance color space.

FIG. 3 illustrates the luminance-chrominance color space and a color vector $F_1$ with its luminance component $Y_1$ and its chrominance components $U_1$ and $V_1$. The origin of the coordinates (Y=0, U=0, V=0) corresponds to the achromatic point of gray point. All color valences with the same color tone as vector $F_1$ and differing light density (brightness) lie along the straight line G coincident with vector $F_1$. If one lengthens the chrominance vector $C_1$ of vector $F_1$ by multiplication by a constant factor k (new chrominance vector $C_2$), the color saturation is increased while the color tone remains the same. It follows that colors with a low degree of color saturation lie near the origin of the U, V chrominance plane, while the more strongly saturated colors lie farther out. The more strongly saturated chrominance vector $C_2$ corresponds to the vector $F_2$ on the color tone line G in FIG. 3. On the other hand, if one starts with the color vector $F_1$ and alters only the luminance by $\Delta Y$, while holding chrominance components $U_1$, $V_1$ constant, one ends up at point F'. Only by simultaneously increasing color saturation corresponding to chrominance vector $C_2$ would one reach the "correct" color vector $F_2$ on color tone straight line G.

This means, in practice, that upon an increase in luminance (brightness) in particular image portions, a desaturation of these image portions occurs, while conversely, upon a decrease in brightness, the corresponding image portions become more strongly saturated. In case of contrast processing, as provided according to FIG. 2 in the luminance channel, the color saturation will also be falsified, if no special measures or precautions are taken.

This problem is solved by a circuit for correction of color saturation, which assures that, upon an increase of the luminance signal from $Y_1$ to $Y_2$ in FIG. 3, the end point of color vector $F_2$ is reached, rather than the point F'. If one employs ray equations for the triangles formed by the vectors $F_1$ and $C_1$ or $F_2$ and $C_2$, the result is:

$$\left|\frac{F_1}{F_2}\right| = \frac{Y_1}{Y_2} = \left|\frac{C_1}{C_2}\right| = \frac{U_1}{U_2} = \frac{V_1}{V_2}.$$

From this follows that $$U_2 = U_1 \cdot \frac{Y_2}{Y_1} \; ; \quad V_2 = V_1 \cdot \frac{Y_2}{Y_1}.$$

A color-correct saturation correction is thus accomplished if both chrominance components $U_1$, $V_1$ are multiplied by the same factor $Y_2/Y_1$. By this operation, the expressed color impression (color tone and color saturation) remains unchanged, even in the case of contrast processing in the luminance channel, in which the light density in specific image portions is deliberately changed; i.e. there is automatic compensation for the increase in color saturation which accompanies a brightness decrease and for the decrease in color saturation which accompanies a brightness increase.

Figure 5:
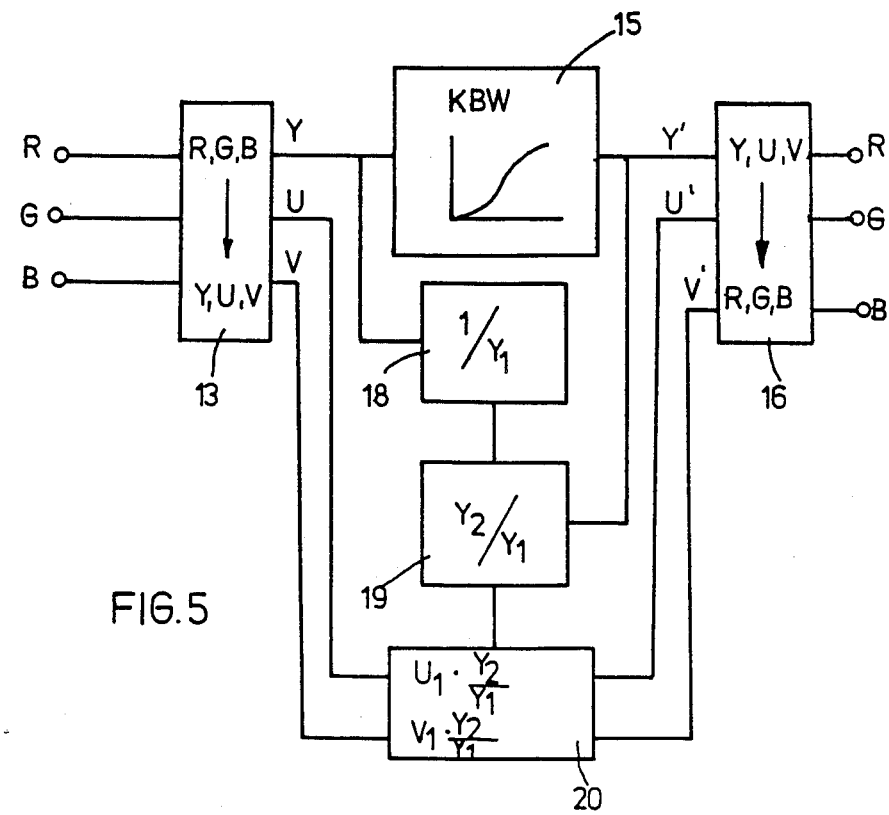
FIG. 5 illustrates the principle of automatic regulation of the color saturation correction in dependence on image brightness.
Figure 4:
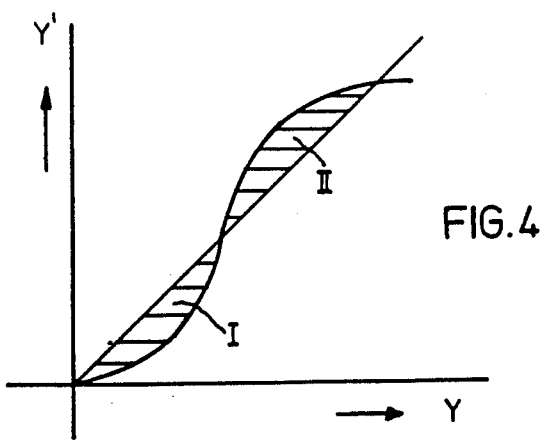
FIG. 4 illustrates an S-shaped gradation characteristic curve used in electronic contrast processing.

Often, in the global contrast valuation of an original image (contrast enhancement circuit 15 in FIG. 2), an S-shaped characteristic curve as shown in FIG. 4 is used. The S-shaped curve means that the brightness is reduced for small initial values of Y (region I) and is increased for large initial values of Y (region II). Additionally, a contrast enhancement occurs in the middle region (crossover point). For clarity, a 45° line for a theoretical 1:1 translation from Y to Y' is drawn. Without the color saturation correction described above, the relatively dim image region I would be oversaturated and the relatively bright image region II would be undersaturated. These color saturation shifts are compensated with the aid of the circuit of FIG. 5.

The transformation of the RGB image signals into YUV signals in element 13 and the transformation back of the modified luminance and chrominance signals Y', U', and V' in element 16 after the contrast enhancement 15 and the color saturation correction 14 were already cursorily described with reference to FIG. 2 (see page 10 above). Contrast enhancement circuit 15 modifies the luminance signal, e.g. according to the characteristic curve of FIG. 4. The original luminance signal is tapped off before the contrast enhancement circuit 15 and fed to a divider circuit 18, which derives the reciprocal value (here $1/Y_1$). This value is then multiplied in a multiplier component 15 with the post-contrast-processing luminance signal Y' (here $Y_2$). In a further multiplication circuit 20, the two original chrominance signals U, V (here $U_1$, $V_1$) are multiplied by the output signal of circuit 19, namely $Y_2/Y_1$. The thus-modified chrominance signals U', V' are then, as previously stated, transformed back in element 16.

Figure 7:
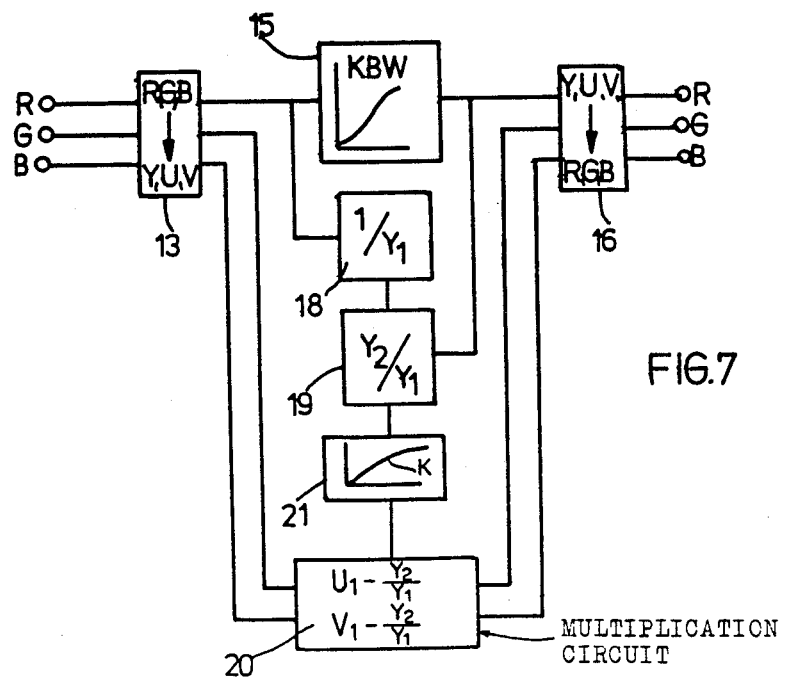
FIG. 7 is a block diagram illustrating in principle how to implement a modified color saturation correction on the basis of the characteristic curve of FIG. 6.

In practice, the chrominance channels have a limited modulation range, so that the situation can arise that, upon an increase in color saturation in one or both channels, the modulation boundary with reference to the RGB channel is reached or exceeded. This overshooting leads to undesirable changes of the color tone, i.e. to color falsifications. A supplemental transfer element 21 with a non-linear characteristic (FIG. 7), inserted between the multiplication circuits 19 and 20, can improve matters. This transfer element serves to provide the luminance relationship $Y_2/Y_1$ with a correction factor k which is relatively large for small values of $Y_2/Y_1$, and decreases toward large values of $Y_2/Y_1$.

Figure 6:
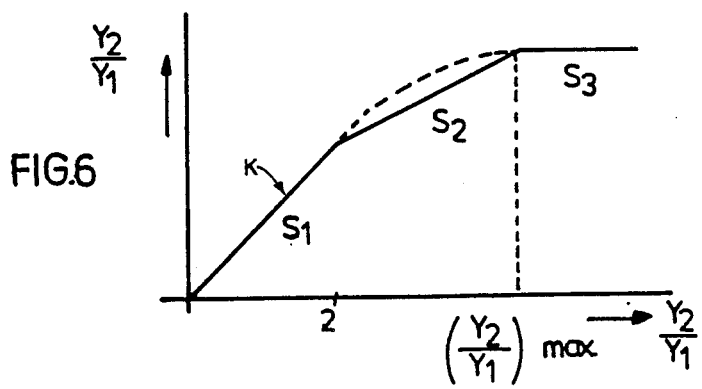
FIG. 6 is a graph illustrating the principle of a color saturation correction modified on the basis of a sublinear, modulation-limited characteristic curve.

As shown in FIG. 6, for example, in the first segment $S_1$ of the characteristic, the slope $k=1$, and in the second segment $S_2$ of the characteristic, the slope $k=0.5$. In the subsequent third segment $S_3$, the characteristic runs horizontal. By this means, the color falsifications accompanying strong color saturation corrections can be minimized.

In practice, the transfer element 21 is implemented using a Look-Up Table (LUT) which is programmed in accordance with the desired sublinear characteristic (see FIG. 6). Instead of a bent or angled-over characteristic with decreasing slope, one could also use a convex, continuous curve, as shown by the dashed line in FIG. 6.

In connection with the contrast valuation, it is here assumed that all image elements are treated with a gradation curve as shown in FIG. 4 (global contrast processing). The contrast valuation or enhancement circuit 15 can also contain an aperture correction, in order to improve the transfer of fine image details and the image sharpness. This involves increasing the contrast at high local frequencies (rates of change in pixel values per unit distance across the image). In contrast to global contrast processing, in this case local contrast processing is involved. Since the local contrast processing is normally done in the luminance channel, it makes sense to combine it with the color saturation correction according to FIG. 5 or FIG. 7.

The circuitry embodiments described here are based on digital signal processing. There is, however, nothing to prevent one from implementing the principles disclosed in FIG. 5 and FIG. 7 in analog circuits.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

I claim:

1. A method of automatically correcting color saturation in electronic image processing, in which a two-dimensional original image is electro-optically scanned along rows and columns for three primary colors R, G, B and corresponding image signals are generated, the resulting image signals are transformed into a luminance signal Y and two color-difference or chrominance signals C1, C2, and the luminance signal is modified by electronic contrast processing, characterized in that the respective luminance signals Y1 and Y2 before and after said electronic contrast processing, respectively, are measured and each of said two color-difference or chrominance signals C1 and C2 is multiplied by the quotient Y2/Y1, thereby providing automatic compensation for increases in color saturation caused by brightness reductions and for decreases in color saturation caused by brightness increases.

2. The method of claim 1, wherein the image signals for the three primary colors R, G, B are transformed into a luminance signal Y and two chrominance signals U, V, and said two chrominance signals are multiplied by the quotient $Y_2/Y_1$ of the luminance signals before and after said electronic contrast processing.

3. The method of claim 2, wherein the quotient $Y_2/Y_1$ is multiplied by a correction factor k, which is selected to be relatively large for small values of the quotient $Y_2/Y_1$ and to decrease toward large values of $Y_2/Y_1$.

4. The method of claim 1, wherein the quotient $Y_2/Y_1$ is multiplied by a correction factor k, which is selected to be relatively large for small values of the quotient $Y_2/Y_1$ and to decrease toward large values of $Y_2/Y_1$.

* * * * *